Patented Feb. 27, 1940

2,191,838

UNITED STATES PATENT OFFICE 2,191,838

PREPARATION OF HOP EXTRACT

Louis Anton Freiherr von Horst, Coburg, Thuringia, Germany

No Drawing. Application January 31, 1938, Serial No. 187,966. In Germany February 4, 1937

5 Claims. (Cl. 99—50.5)

This invention relates to a process for the preparation of hop extracts.

The problem to be solved by a hop extraction process is to recover the hop resins present in the plant and valuable in brewing, in particular α-acid (humulone), β-acid (lupulone) +soft resin, and in some cases the hop oil, as completely as possible and in such a way that changes in the valuable resin ingredients do not occur in the extraction.

It has already been proposed to exclude as far as possible the action of atmospheric oxygen during the preparation of hop extract and at the same time to keep the temperature low.

According to the invention it has been found that particularly satisfactory results as regards the yield of valuable hop resins are obtained if the treatment of the hops for the preparation of the extract, and advantageously also the storage and transport of the extract, are effected in an atmosphere of carbon dioxide; it appears that the fact that the carbon dioxide brings about a certain shift of the pH value in the acid direction during the treatment, has a beneficial effect.

The process according to the invention is carried out therefore in such a way that as much as possible of the entire treatment of the hops to prepare the extract is effected in an atmosphere of carbon dioxide, advantageously commencing with the grinding of the hops under carbon dioxide, and proceeding with the extraction of the ground hops with one of the known organic solvents as commonly used in the preparation of hop extracts and well known in the art, for example ether, alcohol, mixtures of these solvents and the like, again in a carbon dioxide atmosphere, the evaporation of the solvent under carbon dioxide and finally also the dilution of the extract for example with hop tannin extract and the packing of the remaining extract under carbon dioxide; in addition the hop extract packed for instance in sheet metal containers, can be packed in a carbon dioxide atmosphere.

The essential feature is the carrying out of the actual extraction process and the evaporation of the solvent in a carbon dioxide atmosphere.

In carrying out the process the preliminary drying of the hops is advantageously effected in a vacuum in manner known per se.

In general naturally all measures known in the art of preparing hop extract can be used in conjunction with the present invention.

The term carbon dioxide is to be understood within the scope of this specification and the claims to include not only pure carbon dioxide but also any atmosphere strongly enriched with carbon dioxide.

The present process comes particularly into consideration for fresh hops.

What I claim is:

1. In a process for preparing hop extract, the step which consists in effecting the extraction with a suitable organic solvent in an atmosphere of carbon dioxide.

2. In a process for preparing hop extract, the steps which consist in effecting the extraction with a suitable organic solvent in an atmosphere of carbon dioxide, and evaporating said solvent in an atmosphere of carbon dioxide.

3. In a process for preparing hop extract, the steps which consist in grinding the hops in an atmosphere of carbon dioxide, effecting the extraction with a suitable organic solvent in an atmosphere of carbon dioxide, and evaporating said solvent in an atmosphere of carbon dioxide.

4. In a process for the preparation of hop extract the steps which consist in effecting the extraction of the hops with a suitable organic solvent in an atmosphere of carbon dioxide, evaporating said solvent in atmosphere of carbon dioxide, and effecting all further steps up to and including packing in an atmosphere of carbon dioxide.

5. In a process for the preparation of hop extract the steps which consist in grinding the hops in an atmosphere of carbon dioxide, effecting the extraction of the hops with a suitable organic solvent in an atmosphere of carbon dioxide, evaporating said solvent in an atmosphere of carbon dioxide, and effecting all further steps up to and including packing in an atmosphere of carbon dioxide.

LOUIS ANTON FREIHERR VON HORST.